United States Patent
Goikhman et al.

(10) Patent No.: US 11,249,853 B2
(45) Date of Patent: Feb. 15, 2022

(54) SYSTEM AND METHOD FOR CREATING A SNAPSHOT OF A SUBSET OF A DATABASE

(71) Applicant: Huawei Technologies Co., Ltd., Shenzhen (CN)

(72) Inventors: Shay Goikhman, Hod Hasharon (IL); Antonios Iliopoulos, Munich (DE); Eliezer Levy, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 402 days.

(21) Appl. No.: 16/290,283

(22) Filed: Mar. 1, 2019

(65) Prior Publication Data

US 2019/0196914 A1    Jun. 27, 2019

Related U.S. Application Data

(63) Continuation of application No. PCT/CN2017/086907, filed on Jun. 2, 2017.

(30) Foreign Application Priority Data

Sep. 1, 2016  (EP) .................................... 16186857

(51) Int. Cl.
*G06F 16/14* (2019.01)
*G06F 11/14* (2006.01)
(Continued)

(52) U.S. Cl.
CPC .......... *G06F 11/1451* (2013.01); *G06F 11/14* (2013.01); *G06F 12/023* (2013.01);
(Continued)

(58) Field of Classification Search
CPC .. G06F 16/23; G06F 16/2453; G06F 2201/84; G06F 11/1451; G06F 12/1009
See application file for complete search history.

(56) References Cited

U.S. PATENT DOCUMENTS

| 2006/0047999 A1 | 3/2006 | Passerini et al. |
| 2010/0228919 A1 | 9/2010 | Stabrawa et al. |

(Continued)

FOREIGN PATENT DOCUMENTS

| CN | 1560746 A | 1/2005 |
| CN | 101080710 A | 11/2007 |

(Continued)

OTHER PUBLICATIONS

Garcia-Molina, H., et al., "Database Systems: The Complete Book," Second Edition, Prentice Hall, Part 1, 2002, 200 pages.

(Continued)

*Primary Examiner* — Baoquoc N To
(74) *Attorney, Agent, or Firm* — Conley Rose, P.C.

(57) ABSTRACT

A system for creating a snapshot of a subset of a database stored as a plurality of segments in an address space, where the system includes a processor configured to determine from the segments, one or more source segments of the snapshot, and allocate, using a virtual memory creation unit for the snapshot, one or more snapshot segments within the address space, where the one or more snapshot segments are mapped to same physical memory addresses as the one or more source segments, and where the one or more source segments and/or the one or more snapshot segments are set to copy-on-write.

20 Claims, 4 Drawing Sheets

(51) Int. Cl.
  *G06F 16/23* (2019.01)
  *G06F 12/02* (2006.01)
  *G06F 16/953* (2019.01)
  *G06F 16/2453* (2019.01)
  *G06F 12/1009* (2016.01)

(52) U.S. Cl.
  CPC ........ *G06F 16/23* (2019.01); *G06F 16/24542* (2019.01); *G06F 16/953* (2019.01); *G06F 12/1009* (2013.01); *G06F 2201/80* (2013.01); *G06F 2201/84* (2013.01)

(56) References Cited

U.S. PATENT DOCUMENTS

| | | | |
|---|---|---|---|
| 2011/0099151 A1* | 4/2011 | Ylonen | G06F 16/128 707/657 |
| 2013/0024645 A1* | 1/2013 | Cheriton | G06F 12/02 711/206 |
| 2013/0073513 A1* | 3/2013 | Kemper | G06F 16/28 707/600 |
| 2014/0258657 A1 | 9/2014 | Schott et al. | |
| 2015/0127991 A1 | 5/2015 | Davis et al. | |
| 2016/0147814 A1 | 5/2016 | Goel et al. | |
| 2016/0314177 A1 | 10/2016 | Veeraraghavan et al. | |
| 2017/0322997 A1 | 11/2017 | Levy et al. | |
| 2018/0046548 A1* | 2/2018 | Goikhman | G06F 11/1471 |
| 2019/0005093 A1* | 1/2019 | Welton | H04L 67/1097 |

FOREIGN PATENT DOCUMENTS

| | | |
|---|---|---|
| CN | 102541691 A | 7/2012 |
| CN | 104281538 A | 1/2015 |
| CN | 104520819 A | 4/2015 |
| CN | 105190567 A | 12/2015 |
| CN | 105830061 A | 8/2016 |
| CN | 105868228 A | 8/2016 |
| CN | 105912425 A | 8/2016 |
| EP | 3054384 A1 | 8/2016 |
| WO | 2016180504 A1 | 11/2016 |

OTHER PUBLICATIONS

Garcia-Molina, H., et al., "Database Systems: The Complete Book," Second Edition, Prentice Hall, Part 2, 2002, 200 pages.
Garcia-Molina, H., et al., "Database Systems: The Complete Book," Second Edition, Prentice Hall, Part 3, 2002, 200 pages.
Garcia-Molina, H., et al., "Database Systems: The Complete Book," Second Edition, Prentice Hall, Part 4, 2002, 221 pages.
Garcia-Molina, H., et al., "Database Systems: The Complete Book," Second Edition, Prentice Hall, Part 5, 2002, 205 pages.
Garcia-Molina, H., et al., "Database Systems: The Complete Book," Second Edition, Prentice Hall, Part 6, 2002, 214 pages.
Villavieja, C., et al., "DiDi: Mitigating The Performance Impact of TLB Shootdowns Using A Shared TLB Directory," International Conference on Parallel Architectures and Compilation Techniques, 2011, pp. 340-349.
Wikipedia, "Digital Equipment Corporation," Retrieved from the internet:https://en.wikipedia.org/wiki/Digital_Equipment_Corporation on Apr. 25, 2019, 5 pages.
IBM Corporation "IBM System/370 Principles of Operation," GA22-7000-4, Part 1, Sep. 1974, 82 pages.
IBM Corporation "IBM System/370 Principles of Operation," GA22-7000-4, Part 2, Sep. 1974, 81 pages.
IBM Corporation "IBM System/370 Principles of Operation," GA22-7000-4, Part 3, Sep. 1974, 83 pages.
IBM Corporation "IBM System/370 Principles of Operation," GA22-7000-4, Part 4, Sep. 1974, 83 pages.
Kemper, A., et al., "HyPer: A hybrid OLTP&OLAP Main Memory Database System Based on Virtual Memory Snapshots," ICDE, 2011, pp. 195-206.
Clements, A., et al., "RadixVM: Scalable address spaces for multithreaded applications," Revised Aug. 5, 2014, Eurosys'13, Apr. 15-17, 2013, 15 pages.
"Redis Persistence," Retrieved from the internet: http://redis.io/topics/persistence on Apr. 25, 2019, 10 pages.
Costa, G., et al. "Redis on OSv," Retrieved from the internet: http://blog.osv.io/blog/2014/08/14/redis-memonly/, Aug. 14, 2014, 3 pages.
Romanescu, B., et al., "UNified Instruction/Translation/Data (UNITD) Coherence: One Protocol to Rule Them All," 16th International Symposium on High-Performance Computer Architecture (HPCA), Jan. 2010, 12 pages.
Elphinstone, K., et al. "Supporting Persistent Object Systems in a Single Address Space," XP55337844A, Feb. 28, 1996, 12 pages.
Foreign Communication From A Counterpart Application, European Application No. 16186857.5, Extended European Search Report dated Feb. 6, 2017, 12 pages.
Foreign Communication From A Counterpart Application, PCT Application No. PCT/CN2017/086907, English Translation of International Search Report dated Aug. 18, 2017, 7 pages.
Foreign Communication From A Counterpart Application, PCT Application No. PCT/CN2017/086907, English Translation of Written Opinion dated Aug. 18, 2017, 4 pages.
Qian, H, "Snapshot and Durability Support for In-memory Databases," Shanghai Jiaotong University, Software Engineering, 2015, Master, 75 pages. With English abstract.
Qian, H., "Snapshot and Durability Support for In-Memory Databases," Submitted in total fulfilment of the requirements for the degree of Master in Software Engineering, Jan. 12, 2015, 76 pages. With an English Abstract.

\* cited by examiner

SYSTEM AND METHOD FOR CREATING A SNAPSHOT OF A SUBSET OF A DATABASE

CROSS-REFERENCE TO RELATED APPLICATIONS

This application is a continuation of International Patent Application No. PCT/CN2017/086907 filed on Jun. 2, 2017, which claims priority to European Patent Application No. EP16186857.5 filed on Sep. 1, 2016. The disclosures of the aforementioned applications are hereby incorporated by reference in their entireties.

TECHNICAL FIELD

The present disclosure relates to a system for creating a snapshot and to a method for creating a snapshot. The present disclosure also relates to a computer-readable storage medium storing program code, the program code comprising instructions for carrying out such a method.

BACKGROUND

Creating a snapshot of a database is required for example when creating a backup of the database or when a query is to be executed on a consistent state of the database. In many cases, it is desired that the snapshot only comprises a subset of the data of the database.

As an example, a hybrid online transaction processing (OLTP)-online analytical processing (OLAP) database can utilize the fork( ) system call for creating a child process from a parent process serving as a consistent snapshot for the OLAP part for the duration of a long-running query execution. The snapshot can be maintained dynamically by means of the copy-on-write (also referred to as CoW) optimization, the fork system call maps the shared page frames in both processes, the parent process and the child process, as read-only, and only when a page is modified by the parent process, the kernel allocates a new page frame, copies the page's data to the new frame and modifies the data in the new frame.

The same mechanism can be utilized for checkpointing for hybrid and other data stores. The checkpointing flushes a consistent database snapshot in the child process to persistent storage. This child process can also be a long-running one, as it depends on the size of the snapshot and the speed of the input/output (I/O).

In the above methods, the computational effort for creating the snapshot is significant.

SUMMARY

The objective of the present disclosure is to provide a system for creating a snapshot and a method for creating a snapshot, wherein the system for creating a snapshot and the method for creating a snapshot overcome one or more of the above-mentioned problems.

A first aspect of the disclosure provides a system for creating a snapshot of a subset of a database that is stored as a plurality of segments in an address space, the system comprising a determining unit configured to determine from the plurality of segments one or more source segments of the snapshot, and a virtual memory creation unit configured to allocate for the snapshot one or more snapshot segments within the address space, wherein the snapshot segments are mapped to same physical memory addresses as the source segments and wherein the source segments and/or the snapshot segments are set to copy-on-write.

The system of the first aspect departs from the legacy semantics traditionally associated with the forking mechanism, by introducing a copy-on-write mechanism that operates within a single address space, rather than creating a separate address space. This approach enables the application to have fine-grained, lightweight and ad-hoc shadowing (versioning) of memory regions, without the overheads associated with setting up any additional system/application functionality related to a separate address space.

The source segments of a snapshot are those segments in the database for which the snapshot is taken, that is the segments that are duplicated. It is understood that in different application contexts there may be different ways of determining the source segments of a snapshot. For example, source segments of a snapshot can be selected from consecutive segments in the address space. In this regarding, the system according to the first aspect is not limited to a specific way of determining the snapshot segments.

In a first implementation of the system for creating a snapshot according to the first aspect, the virtual memory creation unit is implemented in the kernel of an operating system of the system.

This represents a particularly efficient way of implementing allocating the snapshot segments. For example, the kernel can be the LINUX kernel.

In a second implementation of the system for creating a snapshot according to the first aspect as such or according to the first implementation of the first aspect, the system is configured to, on an access to a segment which maps to a persistent storage allocate one or more page frames, read the segment from the persistent storage to the pale frames, and map the segment and a corresponding snapshot segment to the page frames.

This makes it possible that the system can be applied also for segments which are stored on a persistent storage. The persistent storage can be internal or external to the system. The persistent storage can be for example a hard drive and/or a solid state drive (SSD).

In a third implementation of the system for creating a snapshot according to the first aspect as such or according to any of the preceding implementations of the first aspect, the system further comprises a memory management unit that is configured to induce a page-fault when a source segment and/or a snapshot segment is accessed.

This represents a particularly efficient way of implementing the Copy-on-write. For example, if the snapshot segments are set to Copy-on-write, the memory management unit can be configured to induce a page fault when the consumer unit intends to write to one or more of the snapshot segments.

The system further comprises a consumer unit, in particular a consumer thread that is configured to access the snapshot segments.

This allows a logical separation between the consumer unit that accesses the snapshot segments and the virtual memory creation unit that allocates the snapshot segments.

In a fourth possible implementation of the system for creating a snapshot according to the third implementation of the first aspect, the operating system is further configured to perform COW, in response to the page fault, wherein the COW performing comprises allocating at least one page frame, copying the content of one or more memory pages referenced by the accessed snapshot segments to new memory pages, and setting the corresponding source segments to map to the new memory pages. Thus, the operating system can then handle the page fault by copying the content of one or more memory pages referenced by the accessed snapshot segments to new memory pages, and set the corresponding source segments to map to the new memory pages.

In a fifth implementation of the system for creating a snapshot according to the first aspect as such or according to any of the preceding implementations of the first aspect, the determining unit comprises a compiling unit that is configured to compile a physical execution plan of a database query, in particular an OLAP query, wherein the compiled physical execution plan comprises an unmap command for a snapshot of a segment at a position in the physical execution plan when the snapshot of the segment is no longer accessed during a remaining execution time of the physical execution plan.

In a sixth implementation the system for creating a snapshot according to the first aspect as such or according to any of the preceding implementations of the first aspect, the virtual memory creation unit is further configured to provide a single page table that corresponds to the address space, wherein the page table comprise one or more page table entries for the source segments and one or more page table entries for the snapshot segments, and the page table entries of the snapshot segments are mapped to same physical memory addresses as the page table entries of the source segments to be snapshot.

In a seventh implementation of the system for creating a snapshot according to the first aspect as such or according to any of the preceding implementations of the first aspect, the virtual memory creation unit is further configured to set a read-only flag of the source segments, wherein the read-only flag indicates that the source segments are set to copy-on-write.

In an eight implementation of the system for creating a snapshot according to the first aspect as such or according to any of the preceding implementations of the first aspect, the virtual memory creation unit is further configured to set a read-only flag of the snapshot segments, wherein the read-only flag indicates that the snapshot segments are set to copy-on-write.

The system of this implementation has the advantage that it provides a particularly efficient implementation of executing database query, where a snapshot of a current state of the database is typically required.

The physical execution plan can be compiled, from, e.g., a Structured Query Language (SQL) representation to any physical plans representation a database availability group (DAG) of predefined functions calls, or an intermediate code that can be executed by an interpreter, or the native machine code. For example, one can produce a function in native machine code that takes snapshot segments as arguments, such that executing this function produces the query result. Later, this function can be passed to some thread, along with the actual arguments and the thread executes it.

A second aspect of the disclosure refers to a method for creating a snapshot of a subset of a database that is stored as a plurality of segments in an address space, the method comprising determining from the plurality of segments one or more source segments of the snapshot, and allocating for the snapshot one or more snapshot segments within the address space, wherein the snapshot segments are mapped to same physical addresses as the source segments and wherein the source segments and/or the snapshot segments are set to copy-on-write.

The methods according to the second aspect of the disclosure can be performed by the system according to the first aspect of the disclosure. Further features or implementations of the method according to the second aspect of the disclosure can perform the functionality of the system according to the first aspect of the disclosure and its different implementation forms.

In a first implementation of the method for creating a snapshot of the second aspect, the method further comprises, on an access to a segment which maps to a persistent storage allocating one or more page frames, reading the segment from the persistent storage to the page frames, and mapping the segment and the corresponding snapshot segment to the page frames.

In a second implementation of the method for creating a snapshot of the second aspect as such or according to the first implementation of the second aspect, determining the one or more source segments comprises a step of determining which segments have been changed in a previous checkpoint interval.

The method of this implementation is particularly useful for implementing a check-pointing system which e.g. creates checkpoints in regular time intervals. By determining which segments have been changed in a previous checkpoint interval, the method can determine the source segments that are required for an incremental checkpoint. This has the advantage that the size of the checkpoint is kept as low as possible while still ensuring that a complete checkpoint is created.

In a third implementation of the method for creating a snapshot of the second aspect as such or according to any of the preceding implementations of the second aspect, the method is a method for maintaining a hybrid OLTP and OLAP database system and wherein the method further comprises receiving and executing an OLAP query.

In a fourth implementation of the method for creating a snapshot of the second aspect as such or according to any of the preceding implementations of the second aspect, determining the one or more source segments of the snapshot comprises a step of creating a physical execution plan, wherein in particular the source segments are referenced in the physical execution plan.

The physical execution plan comprises information about which segments are required for carrying out the database query. Thus, the method can precisely determine the snapshot segments.

In a fifth implementation of the method for creating a snapshot of the second aspect as such or according to any of the preceding implementations of the second aspect, the method further comprises determining when a snapshot segment is no longer accessed by a consumer thread, and unmapping the snapshot segment.

Unmapping the snapshot segment can refer to de-allocating snapshot segments.

In a sixth implementation of the method for creating a snapshot of the second aspect as such or according to any of the preceding implementations of the second aspect, the method further comprises setting a read-only flag of the source segments and/or the snapshot segments, inducing a page-fault when one of the source segments is accessed and/or when one of the snapshot segments is accessed, and performing copy-on-write in response to the page fault.

Herein, the access refers to a write access.

The page fault can be dealt with for example by the operating system.

A third aspect of the disclosure refers to a computer-readable storage medium storing program code, the program code comprising instructions for carrying out the method of the second aspect or one of the implementations of the second aspect.

BRIEF DESCRIPTION OF THE DRAWINGS

To illustrate the technical features of some embodiments of the present disclosure more clearly, the accompanying drawings provided for describing some of the embodiments are introduced briefly in the following. The accompanying drawings in the following description are merely some embodiments of the present disclosure, but modifications on these embodiments are possible without departing from the scope of the present disclosure as defined in the claims.

DETAILED DESCRIPTION OF THE EMBODIMENTS

Figure 1:
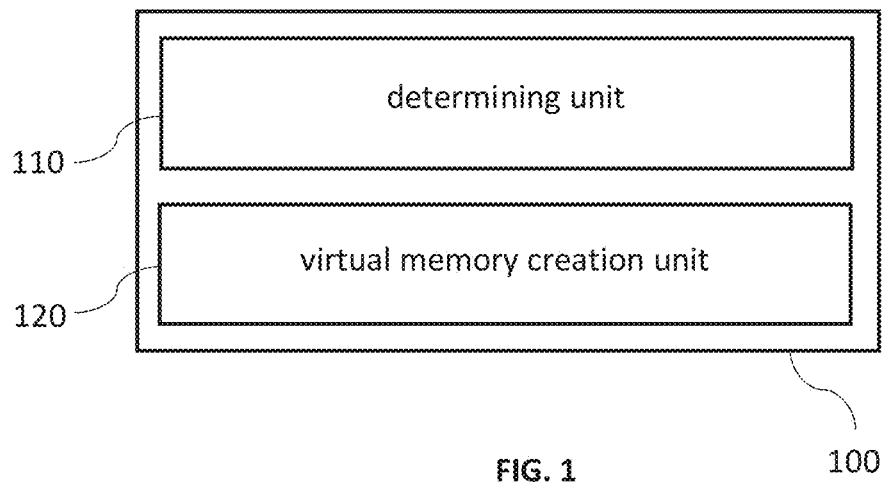
FIG. 1 is a block diagram illustrating a system for creating a snapshot in accordance with an embodiment of the present disclosure.

FIG. 1 shows a system 100 for creating a snapshot of a subset of a database that is stored as a plurality of segments in an address space. A segment comprises one or more memory pages.

The system 100 comprises a determining unit 110 and a virtual memory creation unit 120.

The determining unit 110 is configured to determine from the plurality of segments, one or more source segments of the snapshot.

The virtual memory creation unit 120 is configured to allocate for the snapshot one or more snapshot segments within the single or same address space. Therein, the snapshot segments are mapped to same physical memory addresses as the source segments and wherein the source segments and/or the snapshot segments are set to copy-on-write.

In a traditional scenario, an operating system forking mechanism can operate across two or more distinct and separate address spaces in virtual memory, semantically forming a parent-child relationship. During the fork operation, the operating system kernel creates a new address space and a new page table for the child process. Further, the operating system kernel duplicates the parent's page table hierarchy and page table entries to the newly created page table that belongs to the child.

The aforementioned forking mechanism is further leveraged in an unconventional manner at settings where an application requires a consistent memory snapshot that may be provided lazily by means of the copy-on-write semantics.

In such cases, leveraging the traditional forking mechanism of an operating system bears several performance disadvantages, as the forking mechanism was not designed to serve the particular case of providing memory snapshots in mind, a case which admits several performance improvements over the common case. In particular, the traditional forking mechanism is pessimistic in nature, that is, the mechanism creates a new virtual address space (representing the child process), and duplicates the entire page table hierarchy via copying all pale table entries from the parent, and further marking all of them with read-only protection bits. This incurs significant overheads at runtime for an application that wishes to leverage the mechanism only for the purposes of memory snapshots, but does not depend on having a parent-child relationship (i.e. does not require the creation of a new process, and its accompanying overheads). As such several applications benefit from having a more fine-grained control over the areas of interest to be snapshot thereby reducing the duplication of the entire page table, as well as from avoiding the creation of another separate process (i.e. child process) for each snapshot, by having the snapshot residing on the same address space as the process that requests it.

In particular, the system 100 can benefit from accessing the snapshot data directly in its own address space, instead of accessing the data across a separate address space over an inter-process communication channel that incurs extra overheads (in the case of the traditional parent-child forking mechanism). This saves address space, as only a single address space is required.

The system 100 is based on the concept of a single-address-space copy-on-write snapshot mechanism, able to accommodate the requirements of an application that requires consistent memory snapshots, while avoiding the aforementioned overheads of leveraging the traditional forking mechanism. The system 100 can provide an interface to applications (not shown in FIG. 1) from the operating system and the interface allows for the applications to designate any portions of their address space as memory ranges to be "shadowed" by employing a copy-on-write mechanism within the same address space. The granularity of the ranges is in quantities of memory pages (as supported by the underlying architecture).

The system 100 can be implemented in an operating system kernel. In particular, operating system kernel virtual memory management mechanisms can be enhanced in order to provide the means to supply a copy-on-write based memory snapshot on the address space of the requesting process. The operating system kernel reserves an unused range of the virtual memory address space of the process, equivalent in size to that of the memory ref-lion that the process requested to be snapshot. The operating system kernel further creates new page table entries within the page table of the requesting process, in order to accommodate the region which is being snapshot. The exact number of the page table entries that is created is identical to the number of page table entries that cover the memory region to be snapshot. The newly created page table entries cover the virtual address space memory range reserved for the snapshot, and they are created to point to the same underlying memory pages as the page table entries that cover the memory region to be snapshot. The page table entries of both the original memory range and those of its snapshot are all further modified in order to mark their protection bits as read-only. At this point, the mechanism may return control to the process. The process may subsequently access both the original memory region and the shadowed memory region within the process' own address space. The original memory region may correspond to the source segments, and the shadowed memory region may correspond to the snapshot segments. The copy-on-write semantics ensure that write access to either the original or the shadowed memory range will induce a page-fault via the underlying hardware platform's memory management unit. The page-fault will be handled by the operating system kernel accordingly, which is able to discern that the fault concerns a page that is under copy-on-write semantics (much like the traditional forking mechanism case). The kernel then proceeds to allocate a new page frame, make a copy of the original page onto the newly allocate page frame, and modify the corresponding page table entry (also referred to as PTE) of the page that corresponds to the original memory region to point to the newly allocated and copied page.

Finally, the kernel modifies the protection bits of both page table entries (the one that belongs to the original memory region and the corresponding one that belongs to the shadowed memory region), and sets them to read-write, after which the page-fault handling concludes, and control may return to the process which can continue to access its original as well as its snapshot memory transparently.

In one embodiment, the system is implemented within the LINUX operating system kernel. In particular, the virtual memory management subsystem is extended, and new primitives are exposed by means of introducing a set of new system calls. The main system call allows an application process to request a memory range of interest to be snapshot. The memory range is communicated to the kernel via the system call by providing a starting virtual address (that belongs to the process' own virtual address space), along with a second parameter which denotes the length of the memory region to be snapshot. Internally, the LINUX kernel, based on the memory region address and length, detects the corresponding virtual memory areas (VMAs), which signify the reserved virtual address space memory regions that the kernel has allocated for that particular memory region. The kernel then proceeds to locate an unreserved region in the process's virtual address space which should be as large as the length of the snapshot. This operation is assumed to always succeed in a 64-bit address space. Subsequently, the kernel modifies the page table of the process and creates page table entries to cover the newly reserved virtual address space region to accommodate the snapshot. The page table entries are made to point to the same physical page frames as the page table entries of the original memory region that they are requested to shadow. Both the page table entries of the original memory region, as well as the shadow memory region are further modified in order to set their protection bits to read-only, in order to enforce the copy-on-write semantics.

The system 100 can make use of virtual memory primitives that enable shadowing (versioning) a virtual space range inside a process while setting it copy-on-write. Moreover, it can redefine the handling of the demand-paging associated with the shadowing, such that no additional page-fault and I/O is needed in the case that the shadowed page has been demand-paged and then has been reclaimed, and later the shadowing page is accessed.

These primitives can enable consistent snapshots of selected regions of the database within the same process. Thus, the same pool of threads, allocated once, can service both OLTP and OLAP queries and the checkpoints. An application-level monitor can load balance the number of threads per task and for a global utility metric. The meta-data control information can be natively shared among all the application threads or snapshotted as well.

In particular, the following new virtual memory primitives can be defined:

void*shadow_vma=create_vma_shadow(int nr_vmas, int RW_flag, void*vma, . . . ), where nr_vmas designates the number of source vma segments, create_vma_shadow allocates a new virtual address area in the process's address space, binding it to the physical pages of the one or more source vma(s) and setting all the source vma(s) copy-on-write if the RW_flag is 0. Otherwise, if the RW_flag is 1, the returned shadow_vma is set copy-on-write. If any of the vma(s) pages is mapped to a file and therefore there is no PTE as yet for a page at the time of the create_vma_shadow call, on the first page access a frame will be allocated and its contents read from the file, and the corresponding PTE will be placed both in the vma and in the shadow_vma with the read-only flag according to the call semantics. Subsequently, the memory access will be processed as defined above. Further:

void reclaim_vma_shadow(void*shadow_vma), reclaims the virtual space occupied by the shadow vma and frees any orphan pages associated with it.

As an additional advantage of this method, it is able to provide virtually contiguous memory area snapshot for potentially virtually discontinuous and distinct source VMAs. This may be leveraged to create ad-hoc "views" of data with low overhead (by avoiding memory copying). It may furthermore be used to create ad-hoc virtually contiguous areas of data that are to be scanned serially in memory, thereby enabling the memory scans to run more efficiently, due to the introduced contiguity of the virtual addresses which can be fully predicted and prefetch.

The enhancement of the virtual memory subsystem enables taking a consistent snapshot of selected data within the same process (i.e., within a single virtual address space). We utilize this feature to devise a hybrid OLTP-OLAP database, a checkpointing data store, or any application that requires taking a consistent snapshot to run within the same process.

Figure 2:
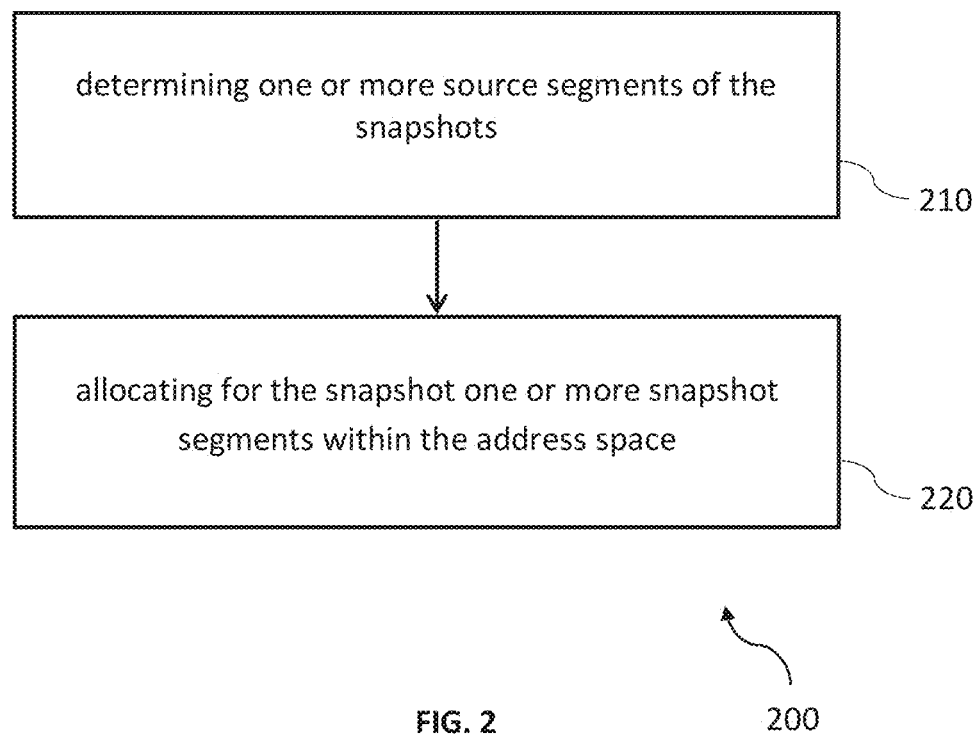
FIG. 2 is a flow chart illustrating a method for creating a snapshot in accordance with an embodiment of the present disclosure.

FIG. 2 shows a method 200 for creating a snapshot of a subset of a database that is stored as a plurality of segments in an address space.

The method comprises the following steps.

Step 210: Determining, from the plurality of segments, one or more source segments of the snapshot.

Step 220: Allocating for the snapshot, one or more snapshot segments within the address space, wherein the snapshot segments are mapped to same physical addresses as the source segments and wherein the source segments and/or the snapshot segments are set to copy-on-write.

Figure 3:
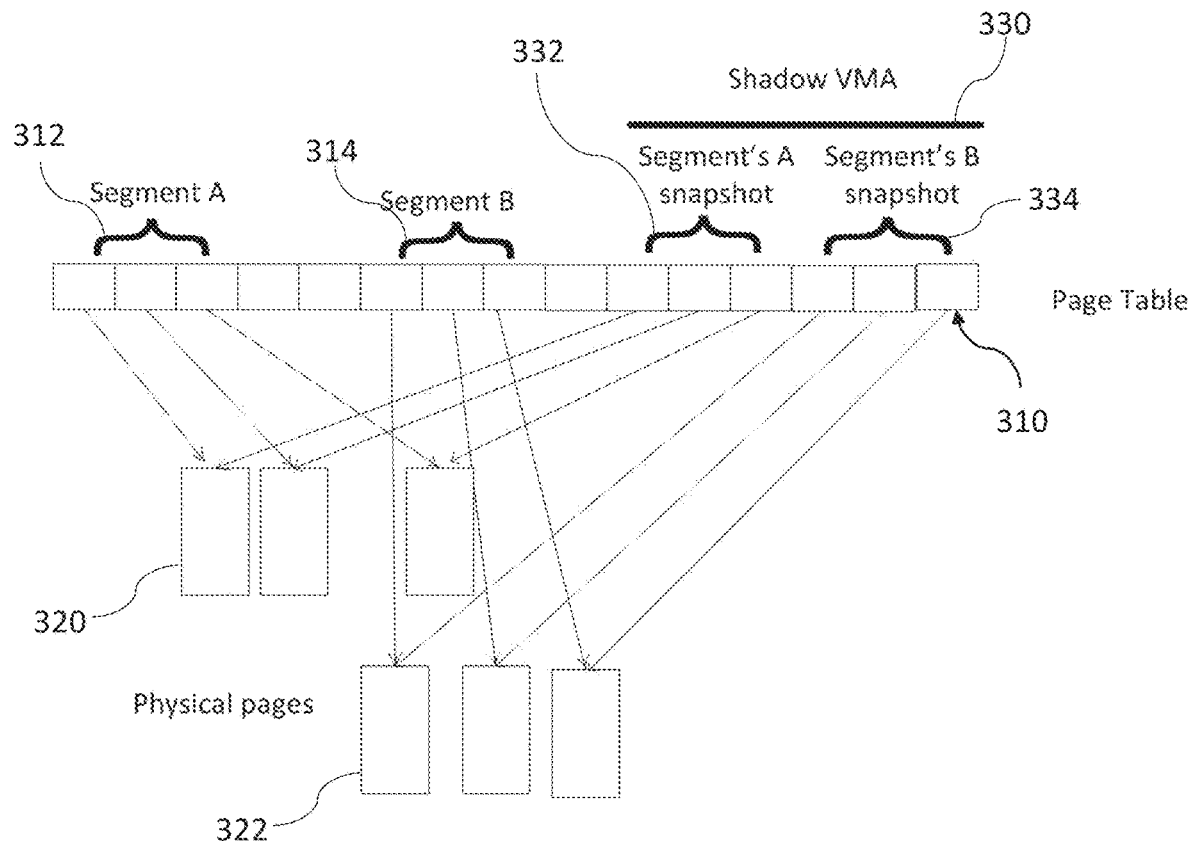
FIG. 3 illustrates segments of a page table and the physical memory pages that the segments map to, in accordance with an embodiment of the present disclosure.

FIG. 3 shows how source segments 312, 314 of a database in a page table 310 map to physical pages 320, 322. Segment A 312 maps to a first set of (three) physical pages 320. Segment B 314 maps to a second set of (three) physical pages 322. Furthermore, the page table 310 comprises entries for a shadow VMA 330. This shadow VMA 330 comprises a snapshot 332 of segment A and a snapshot 334 of segment B. It is noted that one or more entries of the page table 310 refer to one or more VMAs of one or more segments. In particular, the relative position of the PTE defines its virtual address. For example, as the page table is an array of PTEs each taking 4 k of virtual address space, the fifth PTE would then map virtual addresses 20 k to 24 k−1 to some page frame.

FIG. 3 shows a page table 310 comprising page table entries 312, 314 of an original VMA and page table entries 332, 334 of a shadow VMA 330. The original VMA comprises segment A and segment B. The shadow VMA 330 comprises a snapshot of segment A (i.e. snapshot segment A') and a snapshot of segment B (i.e. snapshot segment B'). The page table entries 332 of a snapshot of segment A are mapped to the same physical page frames 320 as the page table entries 312 of the segment A. The page table entries 334 of a snapshot of segment B are mapped to the same physical page frames 322 as the page table entries 314 of the segment B.

Figure 4:
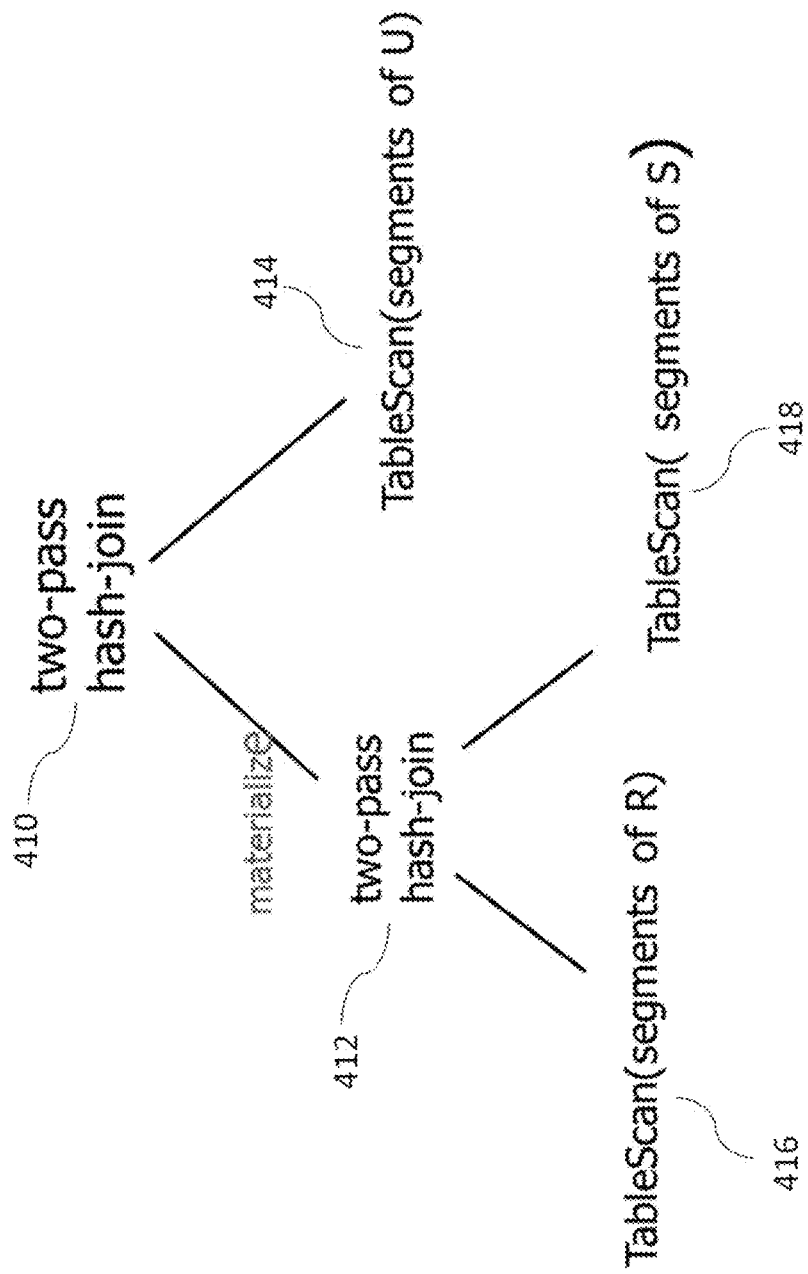
FIG. 4 shows a schematic illustration of an example of a physical execution plan of two joins of three tables of a database, in accordance with an embodiment of the present disclosure.

In an embodiment of the disclosure, the system comprises a compiling unit that is configured to compile a physical execution plan of a database query. FIG. 4 illustrates an example of a physical execution plan of two joins of three tables R, S, and U. The physical execution plan includes the designation of the segments that the query operates on.

In particular, the physical execution plan includes a step 416 of performing a TableScan of the segments of the table R, and a step 418 of performing a TableScan of the segments of the table S. Subsequently, in step 412, a two-pass hash-join is performed on a materialized result of steps 416 and 418, and in step 414 a TableScan is performed on segments of table U. Finally, in step 410 a two-pass hash-join is performed on the materialized result of steps 414 and 412.

The compiling unit accepts OLAP SQL query statements, which it parses, analyses and rewrites, transforming the query parse tree using the database metadata, into a physical execution plan, e.g., a tree of operator function calls and their arguments.

The checkpointer module runs an incremental checkpointing algorithm. The time is divided into checkpoint intervals, when at each end of an interval a snapshot constituting the memory segments that were modified throughout the interval is taken by requesting the snapshot manager to set the segments as inheritable and call fork( ). The checkpointer process outputs these segments to the disk. The process returns success status if all the segments were persisted successfully. Otherwise, the checkpointer module will accumulate the segments that failed to be persisted in previous intervals with the ones modified throughout the current interval in the same snapshot to be persisted at the end of the current interval.

Figure 5:
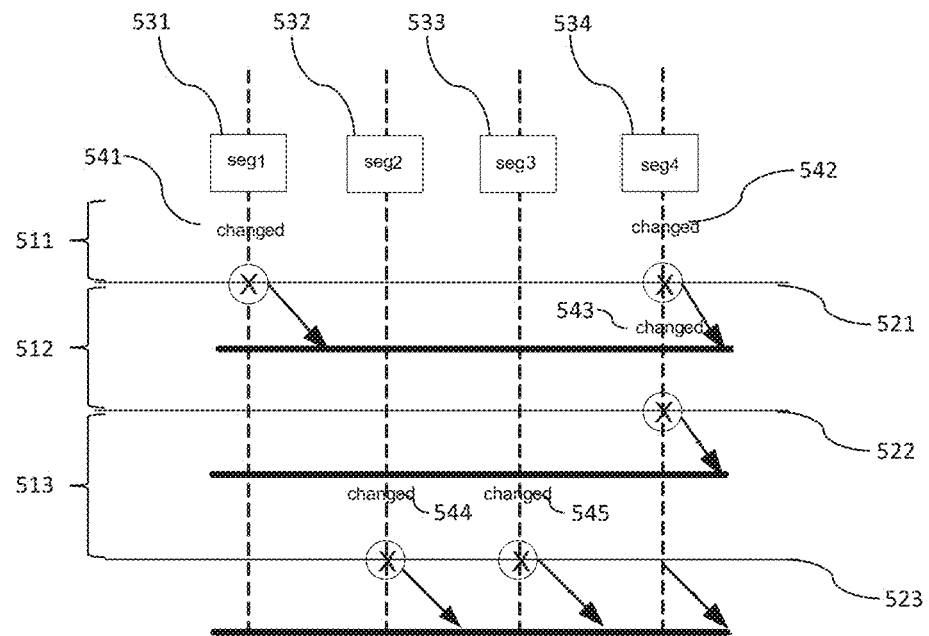
FIG. 5 shows a schematic illustration of a method of determining segments that are accessed by a snapshot process of a checkpointing method in accordance with an embodiment of the present disclosure.

FIG. 5 provides an illustration of a method for checkpointing across several checkpoint intervals. A plurality of four objects 531, 532, 533 and 534 are tracked over four time intervals. The first, second and third time interval are indicated with reference numbers 511, 512, and 513 in FIG. 5. The first time interval 511 precedes the first checkpoint 521. The second and third time intervals 512, 513 are defined as the intervals between first, second and third checkpoint 521, 522, 523. The fourth time interval (not shown) comes after the third checkpoint 523. The first and fourth objects 531, 534 are changed (indicated with reference numbers 541, 542) in the first interval 511. The fourth object is changed 543 again in the second interval 512. In the third interval 513, the second and third object 532, 533 are changed 544, 545.

In the first time interval 511 (that ends at the time of the first checkpoint 521), the change sets consist of the first and fourth object 531, 534, i.e., the objects that were modified before the first checkpoint 521. At the time of the first checkpoint 521, i.e., when the second time interval 512 is started the objects are marked as changed relatively to the first checkpoint 521. The change set consisting of the first and fourth object 531, 534 is persisted successfully during the second time interval 512.

On the outset of the third time interval 513 the change set consisting of the fourth object 534 is detected, i.e., it is detected that a fourth object 534 has been modified between the first and second checkpoint 521, 522. It is attempted to flush the second change set to disk. That results (for some unknown reason) in a disk write failure. In the fourth time interval, the computed change set consists of the second, third and fourth object 532, 533, 534. This change set results from the union of the fourth object 534 that failed to persist in the third time interval 513 and the change set consisting of the second and third object 532, 533 that is detected as changed in the third time interval 513.

In general, applying the 'separation of concerns' concept, the method of snapshot capture needs not being of the checkpointing method's concern, as long as a consistent immutable replica of the state of the objects is created.

At the outset of a new checkpoint, the status variables of the objects that have changed relatively to the last checkpoint need to be retained, together with the marking of all the objects as unchanged for the duration of the forthcoming checkpoint, all these in the presence of multiple parallel updates.

In a preferred embodiment of the disclosure, a system for creating a snapshot of a subset of a database comprises a snapshot manager which is responsible for managing snapshot both for an OLAP query planner module and for a check-pointing module.

This embodiment assumes that the mentioned modules are part of the same hybrid OLTP-OLAP database process. The OLAP query planner module, upon receiving the query, determines which memory regions of contiguous pages, called segments, are required in the query executor. Similarly, the checkpointer module determines the segments needed in the incremental checkpointing algorithm executed in the checkpointer module.

The OLAP query planner module accepts OLAP SQL query statements, which it parses, analyses and rewrites, transforming the query parse tree using the database metadata, into a physical execution plan, e.g., a tree of operator function calls and their arguments. The physical plan includes the designation of the segments the query operates on, see e.g. FIG. 4. Before running the query executor, the query planner requests the snapshot manager to shadow the segments referenced in the physical plan. The shadowed regions constitute a consistent snapshot which is read by the query executor, while at the same time the OLTP part can modify the segments.

The checkpointer module runs an incremental checkpointing algorithm. The time is divided into checkpoint intervals, when at each end of an interval a snapshot constituting the memory segments that were modified throughout the interval is taken by requesting the snapshot manager to shadow the segments. The checkpointer module using one or more threads outputs these segments to the disk. The checkpointer returns success status if all the segments were persisted successfully. Otherwise, the checkpointer module will accumulate the segments that failed to be persisted in previous intervals with the ones modified throughout the current interval in the same snapshot to be persisted at the end of the current interval.

Figure 6:
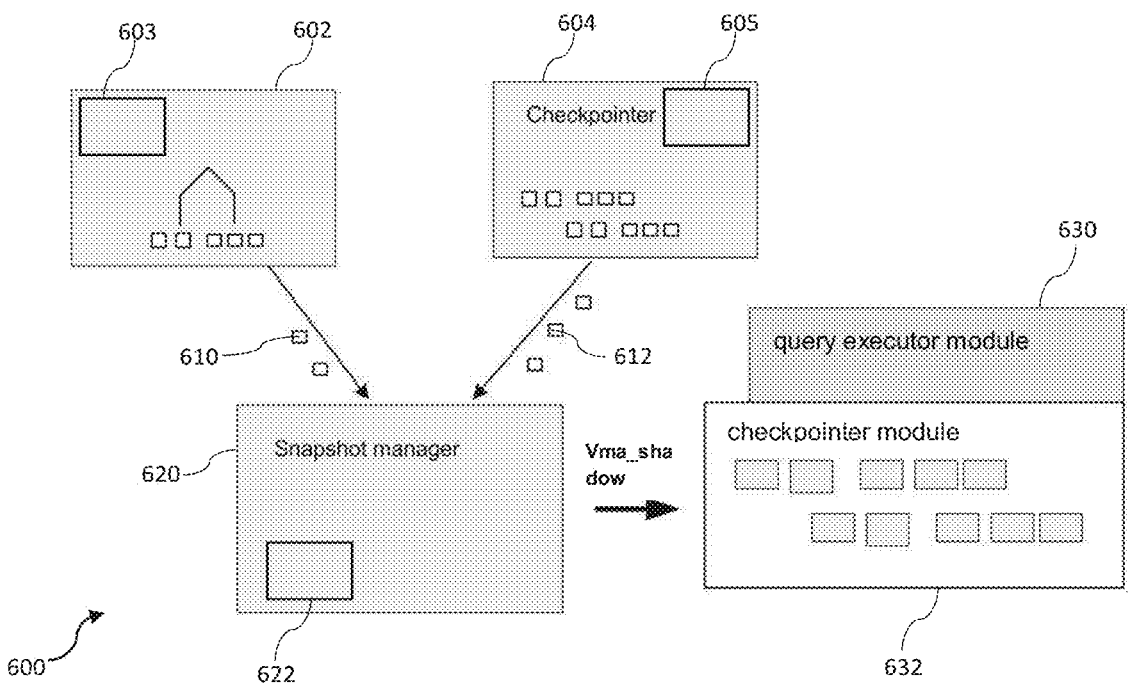
FIG. 6 shows a schematic illustration of a system for creating a snapshot of a subset of a database in accordance with an embodiment of the present disclosure.

FIG. 6 illustrates a system 600 comprising a query planner module 602, a check-pointing module 604 and a snapshot manager 620. The query planner module 602 comprises a first determining unit 603 for determining which segments will be accessed by a query executor process. The query planner module 602 is configured to pass these segments 610 that are accessed by the query executor process to the snapshot manager 620. Similarly, the checkpointing module 604 comprises a second determining unit 605 for determining which segments will be accessed by a checkpointing process. The checkpointing module 604 is configured to pass segments 612 to the snapshot manager 620.

The query planner module 602 is configured to determine the segments appearing in its physical plan. The checkpointing module 604 tracks the segments changed in the checkpointing interval. Each of them in its turn passes its segments to the snapshot manager 620.

The snapshot manager 620 comprises a virtual memory creation unit 622. The virtual memory creation unit 622 is configured to allocate for the segments 610 from the query planner module 602 and for the segments 612 from the checkpointing module 604 a plurality of snapshot segments within a current address space. As part of a vma-shadow operation, the snapshot segments are made available to a query executor module 630 and a checkpointer module 632.

In embodiments of the disclosure, the snapshot manager 620 can provide an interface with a function for initializing the creation of a new snapshot process, a function for adding segments and/or a function for finalizing the creation of the snapshot process.

Embodiments of the disclosure can have the following advantages.

Some embodiments can enable low-overhead snapshotting (versioning) of selected memory regions into the same address space. As such, and moreover, it can be used as an efficient means for process creation in a single-address-space operating system.

Some embodiments can avoid complexity, overhead and inefficiency in managing and sharing information and resources between modules requiring snapshot and comprising the same application. E.g., the method enables the initialization of the OLTP part and the OLAP part and the checkpointer parts to happen only once, whereas in the fork-based method the initialization of OLAP part occurs once per each child forked. The method can avoid redundant system resource over-committing and system processing, e.g., the same demand-paging happening multiple-times.

Some embodiments can enable efficient resource and information sharing among all the application modules requiring snapshot. As such, the method can enable adaptive load balancing among all the parts of an application, e.g., hybrid OLTP-OLAP database, in order to achieve any globally defined utility metric.

Some embodiments can enable the hybrid OLTP-OLAP database to provide more frequent and fresher snapshots for the analytical (OLAP) queries, utilizing lightweight snapshotting functionality. The low overhead of the mechanism can enable the hybrid database to dynamically provide ad-hoc snapshots (per OLAP query) rather than period snapshots.

Some embodiments enable creating virtually contiguous memory regions out of potentially virtual discontinuous page-aligned memory regions. Those regions may be leveraged by the database to provide e.g. ad-hoc data views with very low overhead, avoiding memory copying and/or more efficient memory scans.

The foregoing descriptions are only implementation manners of the present disclosure, the scope of the present disclosure is not limited to this. Any variations or replacements can be easily made through person skilled in the art. Therefore, the protection scope of the present disclosure should be subject to the protection scope of the attached claims.

The invention claimed is:

1. A device for creating a snapshot of a subset of a database stored as a plurality of segments in an address space, wherein the device comprises:
   a memory configured to store instructions; and
   a processor coupled to the memory, wherein the instructions cause the processor to be configured to:
      determine, from the segments, one or more source segments corresponding to first virtual memory addresses (VMAs) in a page table, wherein the one or more source segments are of the snapshot; and
      allocate, for the snapshot, one or more snapshot segments within the address space and corresponding to shadow VMAs in the page table, wherein the one or more snapshot segments are mapped to same physical memory addresses as the one or more source segments, and wherein the one or more source segments or the one or more snapshot segments are set to copy-on-write.

2. The device of claim 1, wherein the one or more snapshot segments are allocated for the snapshot in a kernel of an operating system of the system.

3. The device of claim 1, wherein on an access to a segment which maps to a persistent storage, the instructions further cause the processor to be configured to:
   allocate one or more page frames;
   read the segment from the persistent storage to the one or more page frames; and
   map the segment from the persistent storage and a corresponding snapshot segment to the one or more page frames.

4. The device of claim 1, further comprising a memory management unit coupled to the processor and configured to induce a page-fault when a source segment or a snapshot segment is accessed.

5. The device of claim 4, wherein the instructions further cause the processor to be configured to perform the copy-on-write in response to the page fault, and wherein performing the copy-on-write comprises:
   allocate at least one page frame;
   copy content of one or more memory pages referenced by the accessed snapshot segment to new memory pages; and
   set a corresponding source segment to map to the new memory pages.

6. The device of claim 1, wherein the instructions further cause the processor to be configured to compile a physical execution plan of a database query, wherein the database query is an online analytical processing (OLAP) query, and wherein a compiled physical execution plan comprises an unmap command for a snapshot of a segment at a position in the physical execution plan when the snapshot of the segment at the position in the physical execution plan is no longer accessed during a remaining execution time of the physical execution plan.

7. The device of claim 1, wherein the instructions further cause the processor to be configured to provide a single page table corresponding to the address space, wherein the single page table comprises one or more page table entries for the one or more source segments and one or more page table entries for the one or more snapshot segments, and wherein the one or more page table entries of the one or more snapshot segments are mapped to same physical memory addresses as the one or more page table entries of the one or more source segments of the snapshot.

8. A method for creating a snapshot of a subset of a database stored as a plurality of segments in an address space, wherein the method comprises:
  determining, from the segments, one or more source segments corresponding to first virtual memory addresses (VMAs) in a page table, wherein the one or more source segments are of the snapshot; and
  allocating, for the snapshot, one or more snapshot segments within the address space and corresponding to shadow VMAs in the page table, wherein the one or more snapshot segments are mapped to same physical addresses as the one or more source segments, and wherein the one or more source segments or the one or more snapshot segments are set to copy-on-write.

9. The method of claim 8, wherein on an access to a segment which maps to a persistent storage, the method further comprises:
  allocating one or more page frames;
  reading the segment from the persistent storage to the one or more page frames; and
  mapping the segment from the persistent storage and a corresponding snapshot segment to the one or more page frames.

10. The method of claim 8, wherein determining the one or more source segments comprises determining which source segments have been changed in a previous checkpoint interval.

11. The method of claim 8, wherein the method is further for maintaining a hybrid online transaction processing (OLTP) and online analytical processing (OLAP) database system, and wherein the method further comprises receiving and executing an OLAP query.

12. The method of claim 11, wherein determining the one or more source segments of the snapshot comprises creating a physical execution plan, and wherein the one or more source segments are referenced in the physical execution plan.

13. The method of claim 8, further comprising:
  determining a snapshot segment that is no longer accessed by a consumer thread; and
  unmapping the snapshot segment.

14. The method of claim 8, further comprising:
  setting a read-only flag of the one or more source segments or the one or more snapshot segments;
  inducing a page-fault when one of the one or more source segments is accessed or when one of the one or more snapshot segments is accessed; and
  performing the copy-on-write in response to the page fault.

15. A computer-readable storage medium storing program code, wherein the program code comprises instructions which when executed by a processor, cause the processor to:
  determine, from a plurality of segments, one or more source segments corresponding to first virtual memory addresses (VMAs) in a page table, wherein the one or more source segments are of a snapshot; and
  allocate, for the snapshot, one or more snapshot segments within an address space and corresponding to shadow VMAs in the page table, wherein the one or more snapshot segments are mapped to same physical addresses as the one or more source segments, and wherein the one or more source segments or the one or more snapshot segments are set to copy-on-write.

16. The computer-readable storage medium of claim 15, wherein the instructions further cause the processor to be configured to:
  allocate one or more page frames;
  read a segment from a persistent storage to the one or more page frames; and
  map the segment from the persistent storage and a corresponding snapshot segment to the one or more page frames.

17. The computer-readable storage medium of claim 15, wherein the instructions further cause the processor to be configured to determine which source segments have been changed in a previous checkpoint interval.

18. The computer-readable storage medium of claim 15, wherein the instructions further cause the processor to be configured to:
  determine a snapshot segment that is no longer accessed by a consumer thread; and
  unmap the snapshot segment that is no longer accessed by the consumer thread.

19. The computer-readable storage medium of claim 15, wherein the instructions further cause the processor to be configured to:
  set a read-only flag of the one or more source segments and the one or more snapshot segments;
  induce a page-fault when one of the one or more source segments is accessed and when one of the one or more snapshot segments is accessed; and
  perform the copy-on-write in response to the page fault.

20. The computer-readable storage medium of claim 15, wherein the instructions further cause the processor to be configured to:
  set a read-only flag of either the one or more source segments or the one or more snapshot segments;
  induce a page-fault when one of the one or more source segments is accessed or when one of the one or more snapshot segments is accessed; and
  perform the copy-on-write in response to the page fault.

* * * * *